United States Patent
Cahen et al.

(10) Patent No.: US 9,149,152 B2
(45) Date of Patent: Oct. 6, 2015

(54) ERGONOMIC DISPENSER INTERFACE

(75) Inventors: Antoine Cahen, Lausanne (CH); Daniel Turchi, Paudex (CH)

(73) Assignee: Nestec S.A., Vevey (CH)

( * ) Notice: Subject to any disclaimer, the term of this patent is extended or adjusted under 35 U.S.C. 154(b) by 304 days.

(21) Appl. No.: 13/698,579

(22) PCT Filed: May 20, 2011

(86) PCT No.: PCT/EP2011/058223
§ 371 (c)(1),
(2), (4) Date: Nov. 16, 2012

(87) PCT Pub. No.: WO2011/144720
PCT Pub. Date: Nov. 24, 2011

(65) Prior Publication Data
US 2013/0061760 A1    Mar. 14, 2013

(30) Foreign Application Priority Data

May 21, 2010    (EP) .................................... 10163635

(51) Int. Cl.
*A47J 31/00*    (2006.01)
*A47J 31/44*    (2006.01)
(Continued)

(52) U.S. Cl.
CPC .......... *A47J 31/4403* (2013.01); *A47J 31/4407* (2013.01); *A47J 31/52* (2013.01); *A47J 31/56* (2013.01); *H01H 25/00* (2013.01); *H01H 25/065* (2013.01); *H01H 2231/012* (2013.01)

(58) Field of Classification Search
CPC .................................. A47J 31/56; A47J 31/52
USPC ............ 99/280, 281, 282, 283, 284, 295, 305
See application file for complete search history.

(56) References Cited

U.S. PATENT DOCUMENTS 2,737,880 A * 3/1956 Johnson .......................... 99/305
6,526,872 B2 * 3/2003 Wong .............................. 99/282
(Continued)

FOREIGN PATENT DOCUMENTS

CH    693016    1/2003
DE    3219022    12/1982
(Continued)

OTHER PUBLICATIONS

International Search Report for International Application No. PCT/EP2011/058223 with a Date of mailing of Jul. 14, 2011—3 pages.
(Continued)

*Primary Examiner* — Reginald L Alexander
(74) *Attorney, Agent, or Firm* — K&L Gates LLP

(57) ABSTRACT

A machine (1) for preparing a beverage has: a beverage preparation module for processing one or more beverage ingredients and for dispensing a beverage resulting therefrom; a unit for controlling such processing in accordance with a parameter set to a value stored in the unit; and a user-interface (20) connected to the control unit for acquiring the value from a user and storing the value in the control unit. The user-interface has a first user-selector (21) associated with a first value for the parameter and a second user-selector (22) associated with a second value for the parameter. The first and second user-selectors (21, 22) each comprises a user-actuation adjustment direction (211, 221) for shifting on user-actuation in the adjustment direction the value associated with the user-selector to a user-selected adjusted value selected from a range of values associated with the user-selector. Furthermore, each of the user-selectors comprises a user-actuation initiation direction (212, 222) for initiating on user-actuation in the initiation direction: the control unit to store the user-selected adjusted value as the stored value; and/or the processing in accordance with the parameter set to the user-selected adjusted value as said stored value.

19 Claims, 1 Drawing Sheet

(51) Int. Cl.
*A47J 31/52* (2006.01)
*A47J 31/56* (2006.01)
*H01H 25/00* (2006.01)
*H01H 25/06* (2006.01)

(56) References Cited

U.S. PATENT DOCUMENTS

| | | | |
|---|---|---|---|
| 6,732,634 B2 * | 5/2004 | Schob | 99/283 |
| 7,270,050 B2 | 9/2007 | Glucksman et al. | |
| 7,980,422 B2 * | 7/2011 | Lassota | 222/23 |
| 8,516,372 B2 | 8/2013 | Seeger | |
| 2002/0096054 A1 | 7/2002 | Schob | |
| 2003/0157920 A1 | 8/2003 | Liu | |
| 2005/0016385 A1 * | 1/2005 | Brinkemper et al. | 99/280 |

FOREIGN PATENT DOCUMENTS

| | | |
|---|---|---|
| DE | 203 12 091 | 10/2003 |
| DE | 20304134 | 7/2004 |
| EP | 1772881 | 4/2007 |
| EP | 1992263 | 11/2008 |
| JP | 2005038850 | 2/2005 |
| JP | 2009089791 | 4/2009 |
| WO | 2009092745 | 7/2009 |
| WO | 2010037806 | 4/2010 |

OTHER PUBLICATIONS

Written Opinion of the International Searching Authority on International Application No. PCT/EP2011/058223 with a Date of mailing of Jul. 14, 2011—3 pages.

Office Action issued in RU application 2012155704/12 mailed Nov. 28, 2014. 7 pages.

Manual Entitled: "Miele Gebrauchs- und Montageanweisung Einbau-Kaffeevollautomat CVS 2660 M.-Nr. 06 541 080" 44 pages.

Document Entitled: "Rechnung 0090962" dated Feb. 6, 2004, 1 page.

Japanese Office Action for Application No. P2013-510630, Dispatch No. 200080, dated May 12, 2015, 6 pages.

* cited by examiner

ERGONOMIC DISPENSER INTERFACE

CROSS REFERENCE TO RELATED APPLICATIONS

The present application is a National Stage of International Application No. PCT/EP2011/058223, filed on May 20, 2011, which claims priority to European Patent Application No. 10163635.5, filed on May 21, 2010, the entire contents of which are being incorporated herein by reference.

FIELD OF THE INVENTION

The field of the invention pertains to the field of beverage preparation machines. In particular, the field pertains to the ergonomic handling of such machines by users in order to prepare a beverage.

For the purpose of the present description, a "beverage" is meant to include any liquid food, such as tea, coffee, hot or cold chocolate, milk, soup, baby food, etc . . . A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Certain beverage preparation machines use capsules containing ingredients to be extracted or to be dissolved; for other machines, the ingredients are stored and dosed automatically in the machine or else are added at the time of preparation of the drink.

Most coffee machines possess filling means that include a pump for liquid, usually water, which pumps the liquid from a source of water that is cold or indeed heated through heating means, such as a heating resistor, a thermoblock or the like.

Such machine typically have a brewing unit for holding and extraction the beverage ingredient. To introduce the ingredient into the brewing unit and then remove the ingredient upon use, the brewing unit has a closure mechanism that may be driven by a handle that is operable by a user. Various configurations for manipulating the machine have been disclosed in the art.

EP 1 208 782 discloses a coffee machine having a main body including a brewing unit for extracting coffee capsules. The brewing unit is opened and closed with the aid of a handle that can be turned over the main body by an angle of about a 180 deg. from behind to the front of the main body. The handle has a pair of generally L-shaped levers connected at one end by a hand-drivable transverse rod and pivotally mounted at the opposite end to the opening and closing mechanism of the brewing unit. The pivotable L-shaped levers drive a movable part of the brewing unit via a pair of intermediate levers connected at a first end to this movable brewing unit part and at a second end to the corner of the L-shaped levers. US 2008/0006159, U.S. Pat. No. 7,165,488, WO 2007/111884 and EP 1 829 469 disclose further beverage machines having a brewing unit that can be opened and closed manually by a handle.

More recently, efforts have been specifically devoted to the ease of operation of a beverage preparation machine for a user and ergonomic configuration of such machines, as illustrated in the following documents.

EP 1 878 368 discloses a beverage machine having a functional block that is rotatably mounted on a support base. The functional block can be designed to be removable from the support base. EP 1 864 598 discloses an autonomous beverage machine that can be mounted onto a docking station. The beverage machine is arranged to be operable whether connected to the docking station or disconnected therefrom. WO 2009/074553 and WO 2010/015427 disclose beverage preparation machines that are configured so that they can be lifted single-handed.

For allowing the user to control machine operation various systems have been disclosed in the art, for instance as mentioned in the following references: AT 410 377, CH 682 798, DE 44 29 353, DE 202 00 419, DE 20 2006 019 039, DE 2007 008 590, EP 1 448 084, EP 1 676 509, EP 08155851.2, FR 2 624 844, GB 2 397 510, U.S. Pat. Nos. 4,377,049, 4,458,735, 4,554,419, 4,767,632, 4,954,697, 5,312,020, 5,335,705, 5,372,061, 5,375,508, 5,731,981, 5,645,230, 5,836,236, 5,959,869, 6,182,555, 6,354,341, 6,759,072, US 2007/0157820, WO 97/25634, WO99/50172, WO 2004/030435, WO 2004/030438, WO 2006/063645, WO 2006/090183, WO 2007/003062, WO 2007/003990, WO 2008/104751, WO 2008/138710, WO 2008/138820, WO 2009/135821, WO 2010/003932 and WO 2010/037806.

DE 20 2006 019 039, AT 410 377, U.S. Pat. Nos. 4,377,049, 4,554,419, 4,954,697, 5,685,435, 6,759,072, 6,182,555, WO 2004/030438, WO 2006/090183, WO 2007/003990 WO 2008/138710 and WO 2010/003932 disclose beverage dispensing machines with a generally upright front face having a lower open cavity for receiving a receptacle to be filled via a beverage outlet in the cavity and, on an upper part of the front face, above the opening of this cavity, a generally vertical upper screen, touch screen and/or touch pad arranged as a user-interface. FR 2 624 844 discloses a beverage dispenser having a front face with an open cavity for filling a receptacle and a micro-computer with a keyboard and a monitor housed in the machine's front face next to the cavity opening. More advanced user-interface systems may include user-movable laser pointers for setting a level of fill directly on a user-cup, as taught in WO 2006/063645, or a sensor for acquiring the position of a finger or a user-operated object pointing onto a desired level of fill on a cup, as disclosed in WO 2009/135821, and filling automatically the cup to such a level.

In the field of coffee machines, in particular coffee machines using ground coffee capsules, it is well known to provide a user-interface with a first button for requesting the dispensing of ristretto-size or espresso-size coffee and a second button for requesting the dispensing or regular-size or lungo-size coffee. The beverage volumes associated with each of the two buttons may usually be re-programmed by a user to fit his or her individual preferences.

WO 2010/037806 discloses a coffee machine with an ergonomic toggle-switch movable from a neutral point into two positions for the user to select between a small cup and a large cup. The dispensed beverage volume associated with each position can be programmed by a user. An auxiliary wheel selector is provided for entering and leaving the programming mode. In the programming mode, the toggle-switch is brought by the user into the position to be reprogrammed which initiates dispensing of the beverage. The user maintains the toggle switch in this position until the desired volume is reached, which is then stored as the new volume associated with this position of the toggle-switch. Each time the volume associated with a position of the toggle-switch is changed, the user has to re-enter the programming mode. With such a system a user may easily adjust the dispensed volumes in line with his preferences. However, when several users use the same machines, they have to agree on the dispensed volumes or reprogram the machine regularly or enter a manual dispensing mode.

SUMMARY OF THE INVENTION

A preferred object of the present invention is to provide a beverage preparation machine with a simple user-interface that alleviates at least some of the drawbacks of prior art user interfaces.

In particular, an object of the invention is to provide a simple, ergonomic user-interface for choosing a pre-determined value for a parameter of a beverage to be dispensed, e.g. the volume or taste intensity of the beverage, that can be used by different users having different preferences without burdensome reprogramming the system from one user to the other.

The invention thus relates to a machine for preparing a beverage having: a beverage preparation module for processing one or more beverage ingredients and for dispensing a beverage resulting therefrom; a unit for controlling such processing in accordance with a parameter set to a value stored in the unit; and a user-interface connected to the control unit for acquiring this value from a user and storing this value in the control unit. The user-interface comprises a first user-selector associated with a first value for the parameter and a second user-selector associated with a second value for the parameter, the first value being typically different to the second value.

For instance, the machine is a coffee, tea or soup machine. The machine may be arranged for preparing within a brewing unit a beverage by passing hot or cold water or another liquid through a capsule containing a flavouring ingredient of the beverage to be prepared, such as ground coffee or tea or chocolate or cacao or milk powder.

The brewing unit may be moved by the handle from a first configuration, namely a transfer configuration, in which the flavouring ingredient is introduced into the brewing unit and/or evacuated therefrom, and a second configuration, namely a circulation configuration, in which the liquid is circulated through the flavouring ingredient to prepare the beverage. The circulation and transfer configurations of the brewing unit typically correspond to the handle's circulation and transfer positions, respectively.

Typically, the machine includes one or more of a pump, heater, drip tray, ingredient collector, liquid tank and fluid connection system for providing a fluid connection between the liquid tank and the brewing unit, etc . . . The configuration of a fluid circuit between a source of liquid, e.g. a reservoir, and a brewing unit, i.e. a suitable beverage preparation module, is for example disclosed in greater details in WO 2009/074550.

In accordance with the invention, the first and second user-selectors each comprises a user-actuation adjustment direction for shifting on user-actuation in the adjustment direction the value associated with the user-selector to a user-selected adjusted value selected from a range of values associated with the user-selector. Furthermore, each of the user-selectors comprises a user-actuation initiation direction for initiating on user-actuation in the initiation direction: the control unit to store the user-selected adjusted value as the stored value; and/or the processing in accordance with the parameter set to the user-selected adjusted value as said stored value. Typically, the adjustment direction is different to the initiation direction for each user-selector.

Hence, the machine has two user-selectors each associated with a value for a parameter of the beverage preparation process that may be selected and fine-tuned by a user by actuation of the corresponding user-selector for a subsequent beverage processing.

Hence, each selector has two directions of user actuation, namely a first direction for adjusting the value associated therewith and a second direction for initiating the storage of the adjusted value for the parameter and/or for initiating the processing with the parameter set to this value.

Hence, the machine of the invention, in particular the control unit and the interface, may have different configurations. In a first configuration, the adjustment direction is merely associated with the shifting of the value to a desired adjusted value, the initiation direction being associated with the storage of the adjusted value for the parameter; the starting of the beverage processing being either associated with the initiation direction or with an even further direction of the user-selector or with an even further user-selector. In a second configuration, the adjustment direction is associated with the shifting of the value and simultaneous storage thereof as a desired adjusted value for the parameter, the initiation directing being associated with starting of the beverage processing with the parameter set to the desired adjusted value.

It follows that different users using the same machine may request beverage preparation with a parameter that may be adjusted in a simple manner to meet the preferences of each user without having to operate the machine manually or reprogram in it a burdensome process each time a different user is using the same machine.

Hence, a user may operate the same selector in one direction to choose an adjusted value for the beverage preparation parameter and in another direction, the initiation direction, for storing the the adjusted value and/or starting the beverage preparation process with the parameter set to the adjusted value by the control unit. A very simple and intuitive interface is thus provided for allowing different users to select different values for a parameter of the beverage preparation.

For each user-selector the adjustment direction and the initiation direction may be generally perpendicular to each other. For each user-selector, the adjustment direction can be arched, in particular circular, and the initiation direction may be straight, or vice versa. For example, the user-selector is a push-and-turn button or a push-and-slide button. The button may be turned or slid to select an adjusted value of a range of values along the turning or sliding way, e.g. a straight or arched ruler bearing the selectable values in the range, of the button and then the button is pushed in the initiation direction.

For instance, the first user-selector is associated with a first range of values and the second user-selector is associated with a second range of values non-overlapping with the first range of values. In this case, the two ranges of values are distinct and, when the ranges are combined, they may cover a large span of values easily and intuitively accessible by any user.

To further improve the ergonomics of the interface, each selector may bear or be adjacent to a user-visible marking for indicating the adjustment direction, in particular including symbols indicative of the adjusted values, and a user-visible marking for indicating the initiation direction, in particular including a symbol indicative of the parameterised beverage. A proper marking of the selectors as to the adjustment direction, e.g. with symbols indicative of the different adjusted values such as grading of the selectable adjusted values (for example discrete numbers "1", "2", "3", "4". . . ), and to the initiation direction, e.g. with symbols as to the parameterised beverage to be dispensed such as a type of cup (espresso or lungo).

Each range of values may have a reference value, such as a middle value, that is reprogrammable by a user to shift such range of values correspondingly.

In a preferred embodiment, the control unit is configured to start automatically the processing to form the beverage in accordance with the parameter set to the stored value upon a user-actuation in the initiation direction of the user-selectors. Hence, the user may first select the adjusted value for the parameter and then require starting of the processing by actuating the user-selector in the initiation direction, the adjusted value being stored simultaneously on selection of the adjusted value by actuating the user-selector in the adjustment direction or on actuating the user-selector in the initiation direction. In the latter case, the start of the beverage processing and the storage of the adjusted value for the parameter will thus be triggered by the same operation of the user on the user-interface.

Typically, the ranges of values selectable by the user represent ranges of different volumes of the beverage to be dispensed from the processing of the beverage ingredients. For instance, the values represent volumes of water circulated via a solid ingredient that is infusible, dissolvable and/or dispersible, e.g. ground coffee or tea leaves.

For example, the first user-selector is associated with a range of small volumes and the second user-selector is associated with a range of large volumes, each range having a volume span and a reference volume value, such as a middle volume value, the volume span of each range being in the range of 25 to 50% of its reference volume value. The first user-selector may be associated with a first middle volume value in the range of 30 to 50 ml and/or the second user-selector can be associated with a second middle volume value in the range of 70 to 100 ml. In particular, a coffee machine may have a user-first selector for dispensing espressos, e.g. an adjustable volume of 20 to 60 ml, and a second user-selector for dispensing lungos, e.g. a volume in the range of 70 to 150 ml.

Generally speaking, the ranges of values may represent any parameter of a beverage preparation process, for example: different temperatures of the beverage to be dispensed from the processing of the beverage ingredient(s); or different beverage ingredient ratios of the beverage to be dispensed from the processing of the beverage ingredient(s). For instance, the range of values may refer to additives incorporated into the dispensed beverage, e.g. sugar and/or milk optionally incorporated into coffee, tea or chocolate.

In a particular embodiment, the user-selector(s) may be actuated in the adjustment direction during the beverage preparation process. In this case, the value of the parameter is adjusted either for the current or for a subsequent ingredient processing. In the case, the value of the parameter is adjusted for the current ingredient processing, i.e. the ingredient processing already started with a different adjusted value for the parameter, the process may be changed in so far as technically feasible. For instance, if the value represents a volume of dispensed beverage, increasing the volume during the process can be made possible without particular restriction; however reducing the volume of prepared beverage during process will be limited to the amount of beverage not already prepared at the time the reduction is requested. In other words, it would normally not be possible to reduce the volume of prepared beverage to a volume below the volume of beverage already dispensed at the time of the requested change of desired volume by a user. When this lower limit is reached, the ingredient processing would normally be stopped.

Typically, the beverage preparation module is configured for preparing a beverage by circulating a liquid such as water through a flavouring ingredient. In particular, the beverage preparation module is configured to: receive a capsule containing the flavouring ingredient; circulating a liquid through the capsule for flavouring the liquid and form the beverage. The beverage preparation module can be further configured to evacuate the capsule upon formation of the beverage, in particular evacuate the capsule to a used capsule collector of the machine.

For instance, the beverage preparation module is configured to process at least one ingredient selected from ground coffee, instant coffee, tea leaves, instant tea, liquid milk, powder milk and cacao-containing ingredients. The beverage preparation machine may have a passage for introducing by gravity the flavouring ingredient, in particular within a capsule, into the beverage preparation module, the drive portion being located generally above and/or adjacent the passage when the handle is in the transfer position. Hence, the handle in its transfer position is located closely to the user's hand that inserts the ingredient into the machine's passage so that minimal movement of the hand is required from the insertion of the ingredient to manually actuating the handle.

BRIEF DESCRIPTION OF THE DRAWINGS

The invention will now be described with reference to the schematic drawings, wherein.

DETAILED DESCRIPTION

Figure 1:
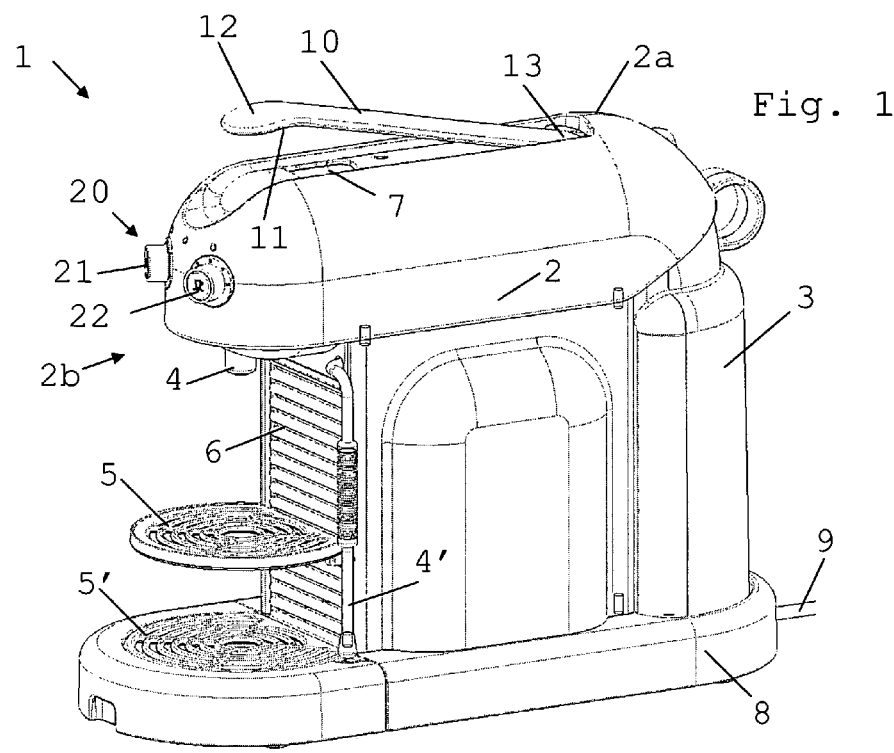
FIG. 1 illustrates an embodiment of a beverage preparation machine according to the invention, FIG. 2 showing a front part of the machine.
Figure 2:
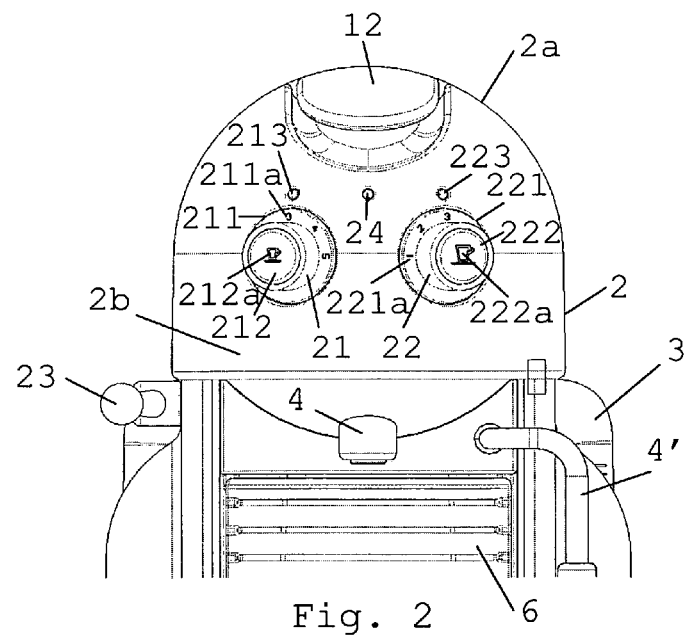

FIGS. 1 and 2 illustrate an embodiment of a beverage preparation machine 1 according to the invention. Machine 1 can be electrically powered, typically by the mains, via an electric cord 9.

Machine 1 has an internal beverage preparation module covered by a housing 2. The beverage preparation module is arranged for holding a flavouring ingredient, in particular a pre-portioned ingredient such as an ingredient supplied to such module within a capsule, and circulating a liquid therethrough to form the beverage.

The liquid, e.g. water, may be stored and supplied to the beverage preparation module from a tank 3. The beverage, upon formation, can be dispensed via an outlet 4 to a dispensing area 5,5', e.g. a support for holding a user cup or mug. The dispensing area may include a first cup support 5 that is movable away from under outlet 4 so as to give access to a lower second cup support 5' for larger cups, e.g. for dispensing lungos or extra-large beverages. The lower cup support 5' may be connected to a base 8 of machine 1. Suitable movable cup supports are for example disclosed in EP 1867260 and in WO 2009/074557, the contents of which are hereby incorporated by way of reference.

Machine 1 also includes a steam and/or hot water generator connected to an outlet 4', e.g. for the preparation of frothed milk and/or tea.

Adjacent to the beverage preparation module, machine 1 may have a collector 6 for used flavouring ingredient, e.g. ground coffee or tea upon brewing, for instance contained within capsules. Collector 6 may be positioned underneath the beverage preparation module to collect upon beverage preparation the used flavouring ingredient evacuated to collector 6, e.g. by gravity. Suitable collectors are for example disclosed in WO 2009/074559 and in WO 2009/135869, which are hereby incorporated by way of reference.

Machine 1 has a handle 10 movable between: a transfer position for loading the ingredient, e.g. within a capsule, into the module and/or evacuating such ingredient from the module; and a circulation position for circulating the liquid through the ingredient.

Typically, handle 10 actuates an ingredient holder with an ingredient chamber, such as a brewing unit, of the beverage preparation module from: a transfer position for insertion of the flavouring ingredient into the holder and/or evacuation of this ingredient therefrom; and a circulation position for circulating the liquid through this ingredient in the ingredient holder to form the beverage. Typically, the ingredient holder, e.g. a brewing unit, has two relatively movable parts that are moved apart for opening the ingredient holder into the transfer position and moved together for closing the ingredient holder into the circulation position. In the circulation position, the ingredient holder may tightly enclose the flavouring ingredient to ensure proper guidance of the liquid through the ingredient.

In the circulation position illustrated in FIG. 2, handle 10 is resting on or in a top face 2a of machine 1. In particular handle 10 can be flush with housing 2.

As shown in FIG. 1, handle 10 is a single-arm lever generally shaped as a straight bar that is slightly curved or bent at its extremity 11 for ergonomic reasons, namely for facilitating the manual application of force onto handle 10 by a convenient orientation of contact surface 12 for a user's hand when handle 10 is moved from the transfer position to the circulation position. In the circulation position (FIG. 2), handle 10 with its extremity 11 may be flush with housing 2 that has a corresponding shape, e.g. to facilitate cleaning of the surface of housing 2.

Hence, handle 10 has a drive portion 12 arranged to be contacted and driven by a human hand to move the handle between the transfer position in which the flavouring ingredient, e.g. enclosed in a capsule, is inserted into the beverage preparation module for instance via a passage 7, and the circulation position in which the flavouring ingredient is housed in the beverage preparation module and liquid may be circulated therethrough to form the beverage.

FIG. 1 shows handle 10 in an intermediate position between the transfer position and the circulation position (FIG. 2). In the transfer position, handle 10 is pivoted upwards to entirely uncover passage 7 for allowing the insertion of the flavouring ingredient, e.g. within a capsule, into the beverage preparation module.

Passage 7 can be arranged for the introduction by gravity of the flavouring ingredient into the beverage preparation module. Drive portion 12 can be located generally above and/or adjacent passage 7 when handle 10 is in the transfer position to facilitate the coordination between manual introduction of a flavouring ingredient, e.g. within a capsule, into passage 7 and manually actuating handle 10 using the same hand.

Furthermore, machine 1 includes a user-interface 20 for initiating circulation of the liquid through the flavouring ingredient in the beverage preparation module. User-interface 20 includes a first selector 21 for dispensing small beverages, e.g. espressos, and a second selector 22 for dispensing large beverages, e.g. lungos.

Machine 1 further includes a toggle 23, e.g. as a master switch or for operating the hot water and/or steam generator with outlet 4'. Toggle 23 may be associated with a LED 24 to indicate the status of machine 1. For instance, when toggle 23 is a master switch, LED 24 may indicate that machine 1 is switched on. When toggle 23 is linked to the water and/or steam generator, LED 24 may indicate a readiness to dispense hot water and/or steam.

The beverage preparation module typically includes one or more of the following components:

a) the ingredient holder, such as a brewing unit, for receiving the flavouring ingredient of this beverage, in particular a pre-portioned ingredient supplied within a capsule, and for guiding an incoming flow of liquid, such as water, through this ingredient to beverage outlet 4;

b) an in-line heater, such as a thermoblock, for heating this flow of liquid to be supplied to the ingredient holder;

c) a pump for pumping this liquid through the in-line heater;

d) one or more fluid connecting members for guiding this liquid from a source of liquid, such as tank 3 of liquid, to beverage outlet 4;

e) an electric control unit, in particular comprising a printed circuit board (PCB), for receiving instructions from a user via an interface and for controlling the in-line heater and the pump; and f) one or more electric sensors for sensing at least one operational characteristic selected from characteristics of the ingredient holder, the in-line heater, the pump, liquid reservoir 3, ingredient collector 6, a flow of this liquid, a pressure of this liquid and a temperature of this liquid, and for communicating such characteristic(s) to the control unit.

The heater may be a thermoblock or an on demand heater (ODH), for instance an ODH type disclosed in EP 1 253 844, EP 1 380 243 and EP 1 809 151. Examples of suitable brewing units and capsule management are for example disclosed in WO 2005/004683, WO2007/135136 and WO 2009/043630, which are hereby incorporated by way of reference. Suitable beverage preparation modules are for instance disclosed in WO 2009/074550 and WO 2009/130099 which are hereby incorporated by way of reference.

Handle 10 and user-interface 20 can be arranged so that user-interface 20 is operable by a human hand while the hand is still in contact with drive portion 12 of handle 10 upon driving handle 10 into the circulation position, as illustrated in FIG. 2.

For instance, drive portion 12 is contacted and actuatable by one or more of the index finger, middle finger, ring finger and little finger, user-interface 20 being operable by the hand's thumb while the other finger(s) is/are still in contact with handle 10, i.e. without having to move the hand away from handle 10 after moving handle 10 into its circulation position. For convenience, drive portion 12 may have a surface or profile specially adapted for being hand driven, e.g. the surface of drive portion 12 may include a means, such as a surface structure or composition, in particular an anti-skid surface that provides friction against the user's hand.

Machine 1 has a front face 2b bearing outlet 4 for delivering the beverage, user-interface 20 being located on or adjacent to front face 2b. In particular, user interface 20 is located below drive portion 12 to be easily accessible by the user's hand while still in position on drive portion 12 on handle 10 upon reaching the handle's circulation position (FIG. 2). For instance, when handle 10 is in the circulation position, user-interface 20 is spaced from drive portion 12 by a distance in the range of 2 to 4 cm.

Machine 1 will now be discussed in greater details with reference to its control unit and interface 20 in conjunction with the beverage preparation module.

As discussed, the beverage preparation module is configured for processing one or more beverage ingredients and for dispensing a beverage resulting therefrom via outlet 4. Machine 1 includes a unit for controlling the processing of the beverage ingredient(s) in accordance with a parameter set to a value stored in the unit; and user-interface 20 connected to the control unit is arranged for acquiring such a value from a user and storing this value in the control unit.

As illustrated in FIGS. 1 and 2, user-interface 20 has a first user-selector 21 associated with a first value for the parameter and a second user-selector 22 associated with a second value for the parameter, the first value being different to the second value.

In accordance with the invention, first and second user-selectors 21,22 each comprise a user-actuation adjustment direction for shifting on user-actuation in the adjustment direction the value associated with the user-selector to a user-selected adjusted value selected from a range of values associated with the user-selector. Furthermore, each of user-selectors 21,22 comprises a user-actuation initiation direction for initiating on user-actuation in the initiation direction: the control unit to store the user-selected adjusted value as the said stored value; and/or the processing in accordance with the parameter set to the user-selected adjusted value as said stored value. The adjustment direction are different to the initiation direction for each user-selector in the illustrated embodiment.

In particular, by turning or rotating buttons 21,22 periphery 211,221 is displaced in front of stationary indicators, e.g. LEDs 213,223, for selecting an adjusted value in a range of values symbolised by signs 211a,221a, e.g. "1" to "5", on each part 211,221 of buttons 21,22. The storage of the adjusted value may be simultaneous with the turning or rotation of the buttons 21,22. In the particular embodiment of machine 1, five positions for adjusted values are shown on each selector 21,22. It is of course possible to provide more or less positions for discrete values or a continuous value scale. For instance, the number of positions may be in the range of 2 to 12, in particular 3 to 10 positions such as 4 to 7 positions. The ranges associated with selectors 21,22 may also have a different number of positions.

By pressing or pushing the central part or head 212,222 bearing a symbol of the parameterised beverage 212a,222a, e.g. small cup and large cup, the value corresponding to the symbolising number ("1" to "5") that is facing indicators 211,221 can be: acquired and stored by the control unit for setting the parameter of a subsequent beverage preparation process if not already done by the rotation or turning of buttons 21,22; and/or the ingredient processing may be started with the stored adjusted value as the said parameter.

LEDs 213,223 may respond to the acquisition and storage of the value by the control unit and/or to the dispensing process with the parameter corresponding to value of the facing responding LED 213,223. Typically, the LED 213,223 facing the stored adjusted value may be activated during the beverage preparation process to provide an ergonomic feedback to the user as to the type of beverage that is being prepared.

For each user-selector 21,22 the adjustment direction, namely rotating along peripheral parts 211,221, and the initiation direction, namely in the pressure or pushing direction of central parts or heads 212,222, are generally perpendicular to each other. As illustrated in FIG. 2, for each user-selector 21,22, the adjustment direction is arched, e.g. circular, along peripheral part 211,221, and the initiation direction is straight, perpendicular to central part or head 212,222. Each user-selector 21,22 may be provided in the form of a push and turn button.

For example, first user-selector 21 is associated with a first range of values and second user-selector 22 is associated with a second range of values non-overlapping with the first range of values. The ranges may of course also be overlapping.

Each range of values can have a reference value, such as a middle value symbolised by number "3" on peripheral part 211,221, within the range that may be reprogrammable by a user to shift the range of values correspondingly.

The ranges of values (symbolised by references "1" to "5" in FIG. 2) may represent ranges of different volumes of the beverage to be dispensed from such processing. For instance, the range of selectable adjusted values of first selector 21 may be shifted between 15 ml to 50 ml and 25 ml to 65 ml. The range of selectable adjusted values of second selector 22 may be shifted between 55 to 90 ml and 80 to 150 ml. If desirable, it is of course also possible to allow the user to reprogram the span of values around a middle value (symbolised by reference "3" in FIG. 2); if the middle value is 35 ml, the range may be stretched between 25 to 45 ml and 15 to 55 ml; if the middle value is 95 ml, the range may be stretched between 75 to 115 ml and 60 to 130 ml, or respectively squeezed from one range to the other about the middle value.

Preferably, the control unit is configured to start automatically the processing in accordance with the parameter set to the stored adjusted value upon a user-actuation in the initiation direction of one of user-selectors 21,22. Hence, no further user-selector or user-operating is needed to start the ingredient processing.

As illustrated in FIG. 2, first user-selector 21, namely the espresso button, is associated with a range of small volumes and second user-selector 22, namely the lungo button, is associated with a range of large volumes. Each range associated with user selectors 21,22 may have a volume span and a reference volume value, such as a middle volume value, the volume span of each range being in the range of 25 to 50% of its reference volume value.

In the case of a coffee machine, the first user-selector 21 can be associated with a first middle volume value in the range of 30 to 50 ml and/or the second user-selector may be associated with a second middle volume value in the range of 70 to 110 ml.

In a variation, the ranges of values may represent ranges of: different temperatures of the beverage to be dispensed from the processing of the beverage ingredients; or different beverage ingredient ratios of the beverage to be dispensed from such processing.

The increment between each position along the range of values symbolised by the numbers "1" to "5" on each part 211,221 of buttons 21,22 may correspond to a temperature of 1 to 5° C., in particular 2 to 3° C., when the parameter that is set via selectors 21,22 relates to the temperature of the dispensed beverage, e.g. coffee, tea or soup. When the values represent weight or volume ratios of ingredients of the beverage to be prepared, e.g. cacao or chocolate dissolved and/or dispersed in milk and/or water or sugar in an aqueous liquid, the increment from one adjusted value to the neighbouring adjusted value may be in the range of 0.01 to 0.1, in particular 0.03 to 0.07.

The invention claimed is:
1. A machine for preparing a beverage comprising:
a beverage preparation module for processing one or more beverage ingredients and for dispensing a beverage resulting therefrom;
a unit for controlling the processing in accordance with a parameter set to a value stored in the unit;
a user-interface connected to the control unit for acquiring the value from a user and storing the value in the control unit, the user-interface comprising a first user-selector associated with a first value for the parameter and a second user-selector associated with a second value for the parameter, the first and second user-selectors each comprises a user-actuation adjustment direction for shifting, on user-actuation in the adjustment direction, the value associated with the user-selector to a user-selected adjusted value selected from a range of values associated with the user-selector, the first and second user-selectors each comprises a user-actuation initiation direction for initiating, on user-actuation in the initiation direction, an action selected from the group consisting of (i) the control unit storing the user-selected adjusted value as the stored value; and (ii) the processing of the one or more beverage ingredients in accordance with the parameter set to the user-selected adjusted value as the stored value, and the parameter for which the first value set by the first user-selector and the second value set by the second user-selector is a volume of the beverage to be dispensed from the processing.

2. The machine of claim 1, wherein for each user-selector the adjustment direction and the initiation direction are different.

3. The machine of claim 1, wherein for each user-selector the adjustment direction is arched, and the initiation direction is straight, or vice versa.

4. The machine of claim 3, wherein each user-selector is a push-and-turn button or a push-and-slide button.

5. The machine of claim 1, wherein the first user-selector is associated with a first range of values and the second user-selector is associated with a second range of values that do not overlap with the first range of values.

6. The machine of claim 1, wherein each range of values has a reference value, within the range that is reprogrammable by a user to shift the range of values correspondingly.

7. The machine of claim 1, wherein the control unit is configured to start automatically the processing in accordance with the parameter set to the stored value upon a user-actuation in the initiation direction of one of the user-selectors.

8. The machine of claim 1, wherein each selector bears or is adjacent to a user-visible marking for indicating the adjustment direction, and a user-visible marking for indicating the initiation direction.

9. The machine of claim 1, wherein the ranges of values represent ranges of different volumes of the beverage to be dispensed from the processing.

10. The machine of claim 1, wherein the first user-selector is associated with a range of small volumes and the second user-selector is associated with a range of large volumes, each range having a volume span and a reference volume value, the volume span of each range being in the range of 25 to 50% of its reference volume value.

11. The machine of claim 10, wherein the first user-selector is associated with a first middle volume value in the range of 30 to 50 ml.

12. The machine of claim 1, wherein the ranges of values represent ranges of different temperatures of the beverage to be dispensed from said processing.

13. The machine of claim 1, wherein the beverage preparation module is configured for preparing a beverage by circulating a liquid through a flavouring ingredient.

14. The machine of claim 13, wherein the beverage preparation module is configured to: receive a capsule containing the flavouring ingredient; and circulate a liquid through the capsule for flavouring the liquid and form the beverage.

15. The machine of claim 1, wherein the beverage preparation module is configured to process at least one ingredient selected from the group consisting of ground coffee, instant coffee, tea leaves, instant tea, liquid milk, powder milk and cacao-containing ingredients.

16. The machine of claim 10, wherein the second user-selector is associated with a second middle volume value in the range of 90 to 130 ml.

17. The machine of claim 1, wherein the ranges of values represent ranges of different beverage ingredient ratios of the beverage to be dispensed from said processing.

18. The machine of claim 13, wherein the beverage preparation module is configured to: receive a capsule containing the flavouring ingredient; circulate a liquid through the capsule for flavouring the liquid and form the beverage; and evacuate the capsule upon formation of the beverage.

19. A machine for preparing a beverage comprising:
a beverage preparation module for processing one or more beverage ingredients and for dispensing a beverage resulting therefrom;
a unit for controlling the processing in accordance with a parameter set to a value stored in the unit;
a user-interface connected to the control unit for acquiring the value from a user and storing the value in the control unit,
the user-interface comprising a first user-selector associated with a first value for the parameter and a second user-selector associated with a second value for the parameter,
the first and second user-selectors each comprises a user-actuation adjustment direction for shifting, on user-actuation in the adjustment direction, the value associated with the user-selector to a user-selected adjusted value selected from a range of values associated with the user-selector,
the first and second user-selectors each comprises a user-actuation initiation direction for initiating, on user-actuation in the initiation direction, an action selected from the group consisting of (i) the control unit storing the user-selected adjusted value as the stored value; and (ii) the processing of the one or more beverage ingredients in accordance with the parameter set to the user-selected adjusted value as the stored value, and
the first user-selector is associated with a first range of volumes, the second user-selector is associated with a second range of volumes, the first range of volumes includes a first volume not present in the second range of volumes, and the second range of volumes includes a second volume not present in the first range of volumes.

* * * * *